(12) United States Patent
Jansson

(10) Patent No.: US 12,467,792 B2
(45) Date of Patent: *Nov. 11, 2025

(54) FLAME DETECTING ARRANGEMENT

(71) Applicant: Firefly AB, Stockholm (SE)

(72) Inventor: Lennart Jansson, Värmdö (SE)

(73) Assignee: Firefly AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,133

(22) Filed: Feb. 9, 2024

(65) Prior Publication Data

US 2024/0183716 A1 Jun. 6, 2024

Related U.S. Application Data

(63) Continuation of application No. 16/648,749, filed as application No. PCT/EP2018/074801 on Sep. 13, 2018, now Pat. No. 11,982,570.

(30) Foreign Application Priority Data

Sep. 20, 2017 (SE) .................................... 1751164-3

(51) Int. Cl.
*G01J 5/00* (2022.01)
*G01J 5/02* (2022.01)
(Continued)

(52) U.S. Cl.
CPC ............. *G01J 5/0018* (2013.01); *G01J 5/027* (2013.01); *G01P 13/00* (2013.01); *G06T 7/70* (2017.01); *G08B 21/18* (2013.01)

(58) Field of Classification Search
None
See application file for complete search history.

(56) References Cited

U.S. PATENT DOCUMENTS 9,924,160 B1 3/2018 Kresch et al.
2005/0128093 A1* 6/2005 Genova ................ G08B 29/183
340/568.1
(Continued)

FOREIGN PATENT DOCUMENTS

CN 101334924 A 12/2008
CN 103124990 A 5/2013
(Continued)

OTHER PUBLICATIONS

International Preliminary Report on Patentability received for PCT Patent Application No. PCT/EP2018/074801, mailed on Apr. 2, 2020, 8 pages.

(Continued)

*Primary Examiner* — Rebecca A Volentine
(74) *Attorney, Agent, or Firm* — MEDLER FERRO WOODHOUSE & MILLS

(57) ABSTRACT

A flame detecting arrangement including: at least one flame detector, arranged with its field-of-view covering a predetermined area; at least one movement sensor, arranged together with the at least one flame detector; and at least one processing device. The at least one processing device is arranged to: receive signals from the movement sensor; detect movement of the flame detector based on these signals; and alert an operator and/or a control system if movement of the flame detector has been detected, in order to enable correction of the field-of-view of the flame detector to the desired field-of-view.

8 Claims, 3 Drawing Sheets

(51) Int. Cl.
  *G01P 13/00* (2006.01)
  *G06T 7/70* (2017.01)
  *G08B 21/18* (2006.01)

(56) References Cited

U.S. PATENT DOCUMENTS

| | | |
|---|---|---|
| 2007/0230798 A1 | 10/2007 | Naylor et al. |
| 2007/0247526 A1 | 10/2007 | Flook et al. |
| 2008/0152232 A1 | 6/2008 | Skans |
| 2008/0272921 A1 | 11/2008 | Cole |
| 2010/0259612 A1 | 10/2010 | Christian et al. |
| 2012/0126700 A1 | 5/2012 | Mayfield et al. |
| 2013/0207807 A1 | 8/2013 | Popper |
| 2016/0203694 A1 | 7/2016 | Hogasten et al. |
| 2017/0104979 A1 | 4/2017 | Shaw et al. |
| 2017/0205282 A1 | 7/2017 | Liang et al. |
| 2018/0316867 A1 | 11/2018 | Mathur et al. |
| 2019/0017865 A1 | 1/2019 | Barcelos |
| 2020/0271524 A1 | 8/2020 | Jansson |
| 2021/0287524 A1 | 9/2021 | Hermann |
| 2022/0157140 A1 | 5/2022 | Jansson |

FOREIGN PATENT DOCUMENTS

| | | |
|---|---|---|
| CN | 103493112 A | 1/2014 |
| CN | 104767965 A | 7/2015 |
| CN | 205608549 U | 9/2016 |
| CN | 107884076 A | 4/2018 |
| CN | 108369764 A | 8/2018 |
| CN | 108896169 A | 11/2018 |
| CN | 109374128 A | 2/2019 |
| EP | 1936576 A1 | 6/2008 |
| EP | 3428897 A1 | 1/2019 |
| FR | 2702069 A1 | 9/1994 |
| JP | 2006-293646 A | 10/2006 |
| WO | 2017/065808 A1 | 4/2017 |

OTHER PUBLICATIONS

International Preliminary Report on Patentability received for PCT Patent Application No. PCT/EP2020/056932, mailed on Sep. 30, 2021, 8 pages.
International Search Report and Written Opinion received for PCT Patent Application No. PCT/EP2018/074801, mailed on Oct. 24, 2018, 10 pages.
International Search Report and Written Opinion received for PCT Patent Application No. PCT/EP2020/056932, mailed on Jun. 26, 2020, 9 pages.
Office Action dated Apr. 20, 2022 issued in U.S. Appl. No. 16/648,749 with double-patenting rejections on pp. 4-6.
U.S. Appl. No. 17/439,535, filed Sep. 15, 2021.

* cited by examiner

FLAME DETECTING ARRANGEMENT

CROSS REFERENCE TO RELATED APPLICATIONS

This application is a continuation application of prior U.S. patent application Ser. No. 16/648,749, filed Mar. 19, 2020, which is a § 371 National Stage Application of PCT International Application No. PCT/EP2018/074801, filed Sep. 13, 2018, which claims priority of Swedish Application No. 1751164-3, filed Sep. 20, 2017, all of which are herein incorporated by reference in their entirety.

TECHNICAL FIELD

The present disclosure relates generally to flame detecting arrangements and methods.

BACKGROUND

There are many different types of flame detectors that can be arranged to detect the presence of flames in an area to be surveilled within the field-of-view of the flame detector. Common varieties are e.g. ultraviolet flame detectors, such as Omniguard® model 660, infrared flame detectors, such as Omniguard® model 760, and ultraviolet-infrared flame detectors, such as Omniguard® model 860. Ultraviolet flame detectors detect ultraviolet radiation from the surveilled area, infrared flame detectors detect infrared radiation from the surveilled area, and ultraviolet-infrared flame detectors detect both types of radiation from the surveilled area.

A flame detector may typically be mounted with its field-of-view covering an area where there is a fire hazard, such as e.g. a turbine enclosure, a generator room, a munitions facility, a battery room, a gas cabinet, an aircraft hangar, a fuel transfer station, a hydrogen storage and filling facility, a compressor station, a silane storage bunker, or a paint spray booth. Flame detectors may be capable of detecting both hydrocarbon (e.g. gasoline, propane, methane, alcohol) and non-hydrocarbon (e.g. hydrogen, silane, hydrazine, magnesium) flames.

Problems with the Prior Art

Once a flame detector has been arranged with its field-of-view covering an area where there is a fire hazard, there is no way of knowing that the surveilled area stays within the field-of-view of the flame detector. This may mean that the flame detector cannot be relied upon to safely monitor an area to be surveilled for the presence of flames.

There is thus a need for an improved flame detecting arrangement.

SUMMARY

The above described problem is addressed by the claimed flame detecting arrangement, which may comprise: at least one flame detector, arranged with its field-of-view covering a predetermined area; at least one movement sensor, arranged together with the at least one flame detector; and at least one processing device. The processing device may be arranged to: receive signals from the movement sensor; detect movement of the flame detector based on these signals; and alert an operator and/or a control system if movement of the flame detector has been detected. Such a flame detecting arrangement may ensure that an operator/control system is informed if there is a risk that the field-of-view of the flame detector to no longer covers the predetermined area to be surveilled, so that the field-of-view of the flame detector can be corrected to the desired, preferably the original, field-of-view.

The above described problem is further addressed by the claimed method for a flame detector arranged with its field-of-view covering a predetermined area. The method may comprise: receiving signals from a movement sensor arranged together with the flame detector; detecting movement of the flame detector based on these signals; and alerting an operator and/or a control system if movement of the flame detector has been detected. Such a method may ensure that an operator/control system is informed if there is a risk that the field-of-view of the flame detector no longer covers the predetermined area to be surveilled, so that the field-of-view of the flame detector can be corrected to the desired, preferably the original, field-of-view.

The at least one movement sensor is preferably arranged together with the at least one flame detector, so that it senses the same movement as the at least one flame detector. The at least one movement sensor may e.g. be arranged within, or mounted onto, the same housing as the at least one flame detector.

In embodiments, the at least one movement sensor comprises a vibration sensor. Movement of the flame detector may be detected based on signals received from this vibration sensor. This allows for detecting any kind of movement of the flame detector, even e.g. a mild push or shake, that may have caused the field-of-view of the flame detector to no longer cover the predetermined area.

In embodiments, an operator and/or a control system is alerted if vibrations beyond a predetermined threshold are detected. Even if it is determined that the field-of-view of the flame detector still covers the predetermined area, it may be desirable to alert an operator and/or a control system to the detection of vibrations beyond a predetermined threshold, since vibrations may cause the flame detector to malfunction in other ways.

In embodiments, it is determined whether the field-of-view of the flame detector still covers the predetermined area. This determination may compare the signals received from the at least one movement sensor with stored orientation data representing the orientation of the at least one flame detector when it is arranged so that its field-of-view covers the predetermined area. This is a simple way of determining whether the field-of-view of the flame detector still covers the predetermined area.

In embodiments, the at least one movement sensor comprises at least one of an accelerometer, a gyroscope, an inertial measurement unit, and/or a direction sensing device, such as a compass. Based on the signals from at least one of these sensors, it may be determined whether the field-of-view of the flame detector still covers the predetermined area.

In embodiments, it is determined whether the field-of-view of the flame detector still covers the predetermined area only after first detecting movement of the flame detector.

In embodiments, it is determined whether the field-of-view of the flame detector still covers the predetermined area using image processing software.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

When a flame detector has been arranged with its field-of-view covering an area where there is a fire hazard, there is no way of knowing that the surveilled area stays within the field-of-view of the flame detector. This may mean that the flame detector cannot be relied upon to safely monitor an area to be surveilled for the presence of flames. It is therefore important that an operator and/or a control system is alerted if movement of the flame detector has been detected.

The present disclosure relates generally to flame detecting arrangements and methods. Embodiments of the disclosed solution are presented in more detail in connection with the figures.

Figure 1:
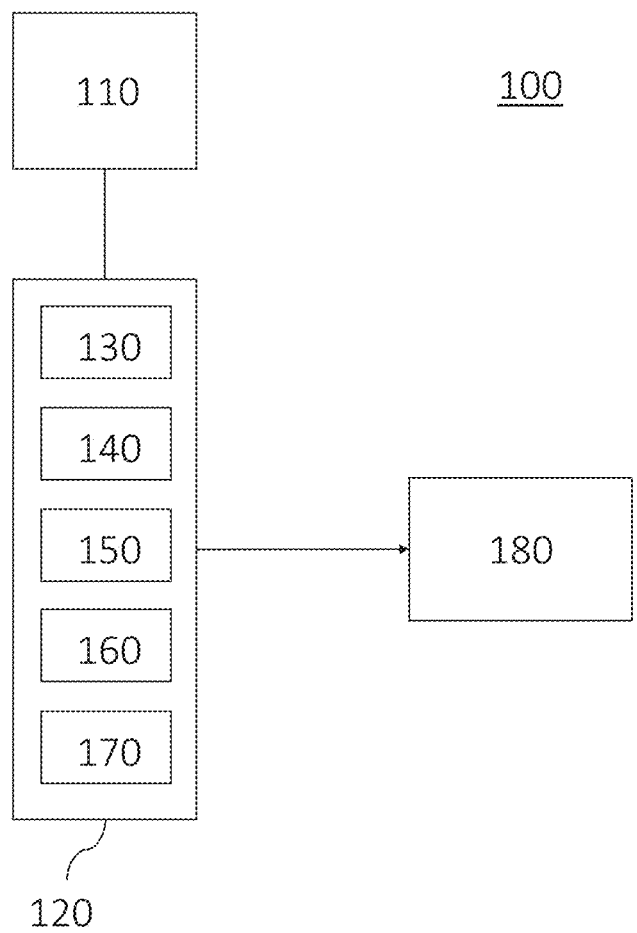
FIG. 1 schematically illustrates a flame detecting arrangement, in accordance with one or more embodiments described herein.

FIG. 1 schematically illustrates a flame detecting arrangement 100, in accordance with one or more embodiments described herein. The flame detecting arrangement 100 comprises at least one flame detector 110, at least one movement sensor 120, and at least one processing device 180. The processing device 180 may be a part of the flame detector 110 or a separate processing device. The at least one movement sensor 120 is arranged together with the at least one flame detector 110, so that it senses the same movement as the at least one flame detector 110. The at least one movement sensor 120 may e.g. be arranged within, or mounted onto, the same housing as the at least one flame detector 110.

Figure 2:
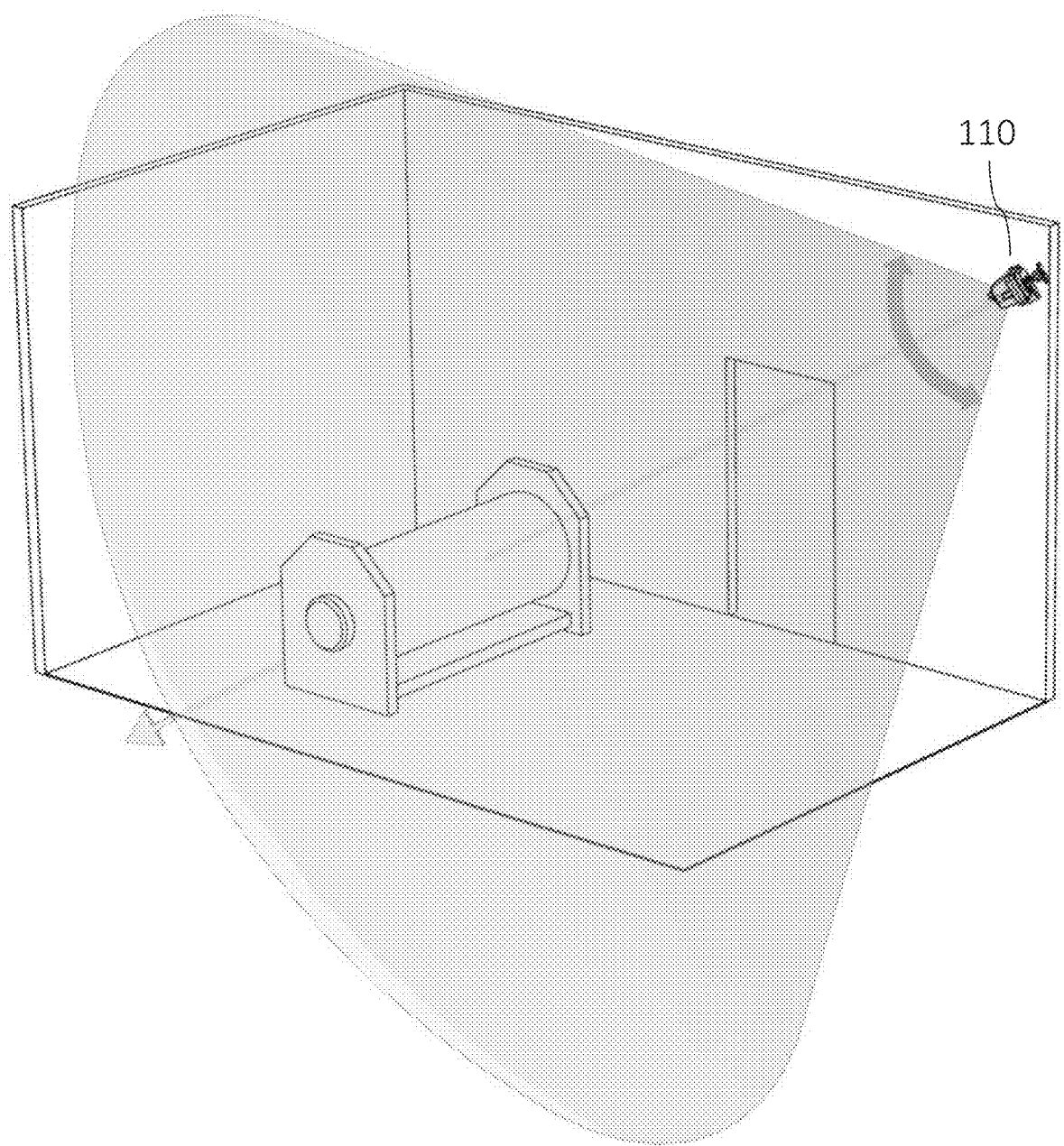
FIG. 2 schematically illustrates the monitoring of an area where there is a fire hazard, in accordance with one or more embodiments described herein.

During use, the at least one flame detector 110 is arranged with its field-of-view covering a predetermined area, as shown schematically in FIG. 2. The at least one flame detector 110 may e.g. be fixedly mounted in a position where its field-of-view covers an area where there is a fire hazard, such as e.g. a turbine enclosure, a generator room, a munitions facility, a battery room, a gas cabinet, an aircraft hangar, a fuel transfer station, a hydrogen storage and filling facility, a compressor station, a silane storage bunker, or a paint spray booth.

The at least one processing device 180 may be arranged to receive signals from the movement sensor 120, and detect movement of the flame detector 110 based on these signals. Movement of a flame detector 110 may e.g. be caused by people or equipment accidentally pushing the flame detector 110. For outdoor mounted flame detectors 110, movement may also be caused by weather conditions, such as e.g. severe winds, waves, or earthquakes.

Since a flame detector 110 cannot be relied upon to safely monitor an area to be surveilled for the presence of flames unless its field-of-view covers the area where there is a fire hazard, it is important to inform any person or control system relying on the flame detector 110 as soon as possible if movement of the flame detector has been detected. The at least one processing device 180 may therefore be arranged to alert an operator and/or a control system if movement of the flame detector has been detected, in order to enable correction of the field-of-view of the flame detector to the desired, preferably the original, field-of-view.

The at least one flame detector 110 may e.g. be an ultraviolet flame detector (such as e.g. Omniguard® model 660), an infrared flame detector (such as e.g. Omniguard® model 760), or an ultraviolet-infrared flame detector (such as e.g. Omniguard® model 860).

The at least one movement sensor 120 may comprise a number of different sensors. In the embodiment shown in FIG. 1, the at least one movement sensor 120 comprises a vibration sensor 130, an accelerometer 140, a gyroscope 150, an inertial measurement unit 160, and a direction sensing device, such as a compass 170. Normally, the at least one movement sensor 120 would not comprise all of these sensors, but any combination of one or more sensors is conceivable.

If the at least one movement sensor 120 comprises a vibration sensor 130, the at least one processing device 180 may be arranged to receive signals from the vibration sensor 130, and detect movement of the flame detector 110 based on these signals. This allows for detecting any kind of movement of the flame detector, even e.g. a mild push or shake, which may have caused the field-of-view of the flame detector to no longer cover the predetermined area.

The at least one processing device 180 may be arranged to alert an operator and/or a control system if vibrations beyond a predetermined threshold are detected, even if it is determined that the field-of-view of the flame detector still covers the predetermined area. It may be desirable to alert an operator and/or a control system to the detection of vibrations beyond a predetermined threshold, since vibrations may cause the flame detector to malfunction.

The at least one processing device 180 may be arranged to determine whether the field-of-view of the flame detector 110 still covers the predetermined area.

If the at least one movement sensor 120 comprises an accelerometer 140, the at least one processing device 180 may be arranged to determine whether the field-of-view of the flame detector 110 still covers the predetermined area based at least on signals received from the accelerometer 140. An accelerometer 140 is a compact device designed to measure non-gravitational acceleration. When an accelerometer 140 goes from a standstill to any velocity, it is designed to respond to the vibrations associated with such movement. It uses microscopic crystals that go under stress when vibrations occur, and from that stress a voltage is generated to create a reading on any acceleration. A three-axis accelerometer 140 may be used to identify orientation, and thereby determine whether the orientation has changed from the orientation when the at least one flame detector 110 was arranged with its field-of-view covering the predetermined area.

If the at least one movement sensor 120 comprises a gyroscope 150, the at least one processing device 180 may be arranged to determine whether the field-of-view of the flame detector 110 still covers the predetermined area based at least on signals received from the gyroscope 150. A gyroscope 150 is a device that uses gravity to help determine orientation. Its design consists of a freely-rotating disk called a rotor, mounted onto a spinning axis in the center of a larger and more stable wheel. As the axis turns, the rotor remains stationary to indicate the central gravitational pull. Since a gyroscope 150 determines orientation, it may be used to determine whether the orientation has changed from the orientation when the at least one flame detector 110 was arranged with its field-of-view covering the predetermined area.

If the at least one movement sensor 120 comprises an inertial measurement unit 160, the at least one processing device 180 may be arranged to determine whether the field-of-view of the flame detector 110 still covers the predetermined area based at least on signals received from the inertial measurement unit 160. An inertial measurement unit (IMU) 160 is an electronic device that measures and reports a body's specific force and angular rate using a combination of accelerometers and gyroscopes. Since an inertial measurement unit 160 determines orientation, it may be used to determine whether the orientation has changed from the orientation when the at least one flame detector 110 was arranged with its field-of-view covering the predetermined area.

If the at least one movement sensor 120 comprises a direction sensing unit such as a compass 170, the at least one processing device 180 may be arranged to determine whether the field-of-view of the flame detector 110 still covers the predetermined area based at least on signals received from the compass 170. Since a compass 170 determines orientation, it may be used to determine whether the orientation has changed from the orientation when the at least one flame detector 110 was arranged with its field-of-view covering the predetermined area.

In order to determine whether the field-of-view of the flame detector 110 still covers the predetermined area, it is advantageous to during setup store orientation data representing the orientation of the at least one flame detector 110 when it is arranged with its field-of-view covering the predetermined area, so that the signals from the accelerometer 140, gyroscope 150, inertial measurement unit 160, and/or compass 170 may be compared with these stored orientation data.

The at least one processing device 180 may be arranged to only determine whether the field-of-view of the flame detector 110 still covers the predetermined area after first detecting movement of the flame detector 110.

The at least one processing device 180 may be arranged to determine whether the field-of-view of the flame detector 110 still covers the predetermined area using image processing software.

Figure 3:
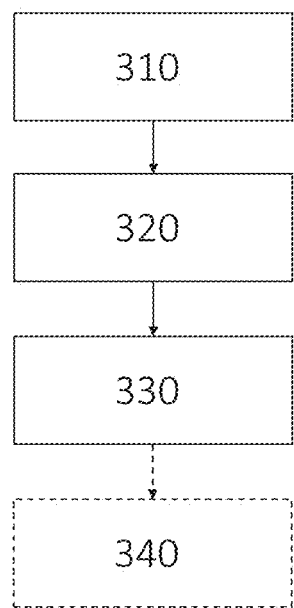
FIG. 3 schematically illustrates a method for a flame detector arranged with its field-of-view covering a predetermined area, in accordance with one or more embodiments described herein.

FIG. 3 schematically illustrates a method 300 for a flame detector 110 arranged with its field-of-view covering a predetermined area. The method 300 may comprise:

Step 310: receiving signals from a movement sensor 120 arranged together with the flame detector 110.

Step 320: detecting movement of the flame detector 110 based on these signals.

Step 330: alerting an operator and/or a control system if movement of the flame detector 110 has been detected.

Use of the method 300 allows for informing an operator/control system if there is a risk that the field-of-view of the flame detector 110 to no longer covers the area where there is a fire hazard, so that the field-of-view of the flame detector can be corrected to the desired, preferably the original, field-of-view.

In embodiments, the at least one movement sensor 120 comprises a vibration sensor 130. In embodiments, the receiving 310 comprises receiving signals from the vibration sensor 130, and the detecting 320 comprises detecting movement of the flame detector 110 based on these signals. This allows for detecting any kind of movement of the flame detector, even e.g. a mild push or shake, which may have caused the field-of view of the flame detector to no longer cover the predetermined area.

In embodiments, the at least one movement sensor 120 comprises at least one of: an accelerometer 140; a gyroscope 150; an inertial measurement unit 160; and/or a direction sensing unit such as a compass 170.

The method 300 may further comprise:

Step 340: determining whether the field-of-view of the flame detector 110 still covers the predetermined area.

The determining 340 of whether the field-of-view of the flame detector 110 still covers the predetermined area may be based at least on the signals received from the at least one movement sensor 120.

In embodiments, the determining 340 of whether the field-of-view of the flame detector 110 still covers the predetermined area compares the signals received from the at least one movement sensor 120 with stored orientation data representing the orientation of the at least one flame detector 110 when it is arranged with its field-of-view covering the predetermined area. This is a simple way of determining whether the field-of-view of the flame detector still covers the predetermined area.

In embodiments, the determining 340 of whether the field-of-view of the flame detector 110 still covers the predetermined area takes place only after first detecting 320 movement of the flame detector.

In embodiments, the determining 340 of whether the field-of-view of the flame detector 110 still covers the predetermined area uses image processing software.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. Flame detecting arrangement comprising:
   a housing;
   at least one flame detector in the housing and arranged with its field-of-view covering a predetermined area;
   at least one movement sensor in the housing and arranged together with the at least one flame detector; and
   at least one processing device in the housing and arranged to:
   receive signals from the movement sensor;
   detect movement of the flame detector based on signals from the at least one movement sensor, the signals relating to vibration of the at least one flame detector;
   determine whether the field-of-view of the flame detector still covers the predetermined area, wherein signals received from the at least one movement sensor are used to determine whether the field-of-view of the flame detector still covers the predetermined area by comparing the signals received from the movement sensor with stored orientation data representing the orientation of the at least one flame detector when it is arranged with its field-of-view covering the predetermined area; and transmit an alert signal to an operator and/or a control system if there is a determination that the field-of-view of the flame detector no longer covers the predetermined area;

wherein the at least one movement sensor comprises at least one of:

a vibration sensor an accelerometer;

a gyroscope;

an inertial measurement unit; or a direction sensing device.

2. The flame detecting arrangement according to claim 1, wherein the at least one movement sensor comprises a vibration sensor.

3. The flame detecting arrangement according to claim 2, wherein the at least one processing device is arranged to receive signals from the vibration sensor, and detect movement of the flame detector based on these signals.

4. The flame detecting arrangement according to claim 1, wherein the at least one processing device is further arranged to alert an operator and/or a control system if vibrations beyond a predetermined threshold are detected.

5. A method for a flame detector arranged with its field-of-view covering a predetermined area, the method comprising:

receiving signals from at least one movement sensor arranged together with the flame detector in a housing;

detecting movement of the flame detector based on signals from the at least one movement sensor, the signals relating to vibration of the flame detector from the at least one movement sensor using a processing device arranged in the housing;

determining, using the processing device arranged in the housing, whether the field-of-view of the flame detector still covers the predetermined area by comparing the signals received from the movement sensor with stored orientation data representing the orientation of the at least one flame detector when it is arranged with its field-of-view covering the predetermined area; and transmitting an alert signal to an operator and/or a control system if there is a determination that the field-of-view of the flame detector no longer covers the predetermined area, wherein the at least one movement sensor comprises at least one of:

a vibration sensor, an accelerometer, a gyroscope, an inertial measurement unit, or a direction sensing device.

6. The method according to claim 5, wherein the at least one movement sensor comprises a vibration sensor.

7. The method according to claim 6, wherein the receiving comprises receiving signals from the vibration sensor, and the detecting comprises detecting movement of the flame detector based on these signals.

8. The method according to claim 5, wherein the alerting further comprises alerting an operator and/or a control system if vibrations beyond a predetermined threshold are detected.

* * * * *